(12) United States Patent
Duerr et al.

(10) Patent No.: US 10,860,982 B2
(45) Date of Patent: Dec. 8, 2020

(54) CODE-FREE INGESTION OF JOB POSTINGS (71) Applicant: Microsoft Technology Licensing, LLC, Redmond, WA (US)

(72) Inventors: Anthony Duane Duerr, Castro Valley, CA (US); Iain MacNaughton, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1267 days.

(21) Appl. No.: 14/526,357

(22) Filed: Oct. 28, 2014

(65) Prior Publication Data
US 2016/0117641 A1 Apr. 28, 2016

(51) Int. Cl.
G06Q 10/10 (2012.01)
G06Q 50/00 (2012.01)

(52) U.S. Cl.
CPC ......... *G06Q 10/1053* (2013.01); *G06Q 50/01* (2013.01)

(58) Field of Classification Search
None
See application file for complete search history.

(56) References Cited

U.S. PATENT DOCUMENTS

2014/0279622 A1* 9/2014 Lamoureux ............ G06Q 50/01
705/319

OTHER PUBLICATIONS

Alan Henry, "Find Undavertised Job Openings with a Clever Google Serach," Jan. 7, 2014.*

* cited by examiner

Primary Examiner — Aryan E Weisenfeld
(74) Attorney, Agent, or Firm — Schwegman Lundberg & Woessner, P.A.

(57) ABSTRACT

A method of ingesting job postings into a social-networking system is disclosed. A candidate mapping is identified between a type of a data field corresponding to content items published on a third-party system and a type of a data field corresponding to job postings published on a social-networking system. A user interface is generated to prompt an administrator to identify the candidate mapping as a confirmed mapping. Based on the administrator identifying the candidate mapping as the confirmed mapping, the mapping is included in a data model corresponding to the content items published on the third-party system. Additional job postings to be published on the social-networking system are generated based on an application of the data model to additional content items published on the third-party system.

17 Claims, 6 Drawing Sheets

CODE-FREE INGESTION OF JOB POSTINGS

TECHNICAL FIELD

The present disclosure generally relates to the technical field of social-networking systems and, in one embodiment, to ingesting job postings from a third-party system into a social network system.

BACKGROUND

A social network system, such as Linked in, may allow certain members (e.g., job recruiters) to submit job postings for publication on the social network system. Each of the job postings may include various content items, including, for example, a title of the job, a name of the employer, a location of the employer, a job description, minimum requirements for applicants, desired skills of applicants, and so on.

Upon accessing the social network system, other members may then be presented with various submitted job postings based on various criteria, such as how closely the qualifications specified in a member profile of the member correspond to the requirements of the job postings.

Unfortunately, when the only job postings that are available for presentation to a member are job postings that were submitted by other members, the member may not be exposed to other job opportunities that are available, such as other job opportunities published on third-party systems.

DESCRIPTION OF THE DRAWINGS

Some embodiments are illustrated by way of example and not limitation in the FIGS. of the accompanying drawings, in which.

DETAILED DESCRIPTION

The present disclosure describes methods, systems and computer program products for ingesting into a social-networking system job postings published on a third-party system. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

In various example embodiments, a candidate mapping is identified between a type of a data field corresponding to content items published on a third-party system and a type of a data field corresponding to job postings published on a social-networking system. A user interface is generated to prompt an administrator to identify the candidate mapping as a confirmed mapping. Based on the administrator identifying the candidate mapping as the confirmed mapping, the mapping is included in a data model corresponding to the content items published on the third-party system. Additional job postings to be published on the social-networking system are generated based on an application of the data model to additional content items published on the third-party system.

Other advantages and aspects of the present inventive subject matter will be readily apparent from the description of the figures that follows.

Figure 1:
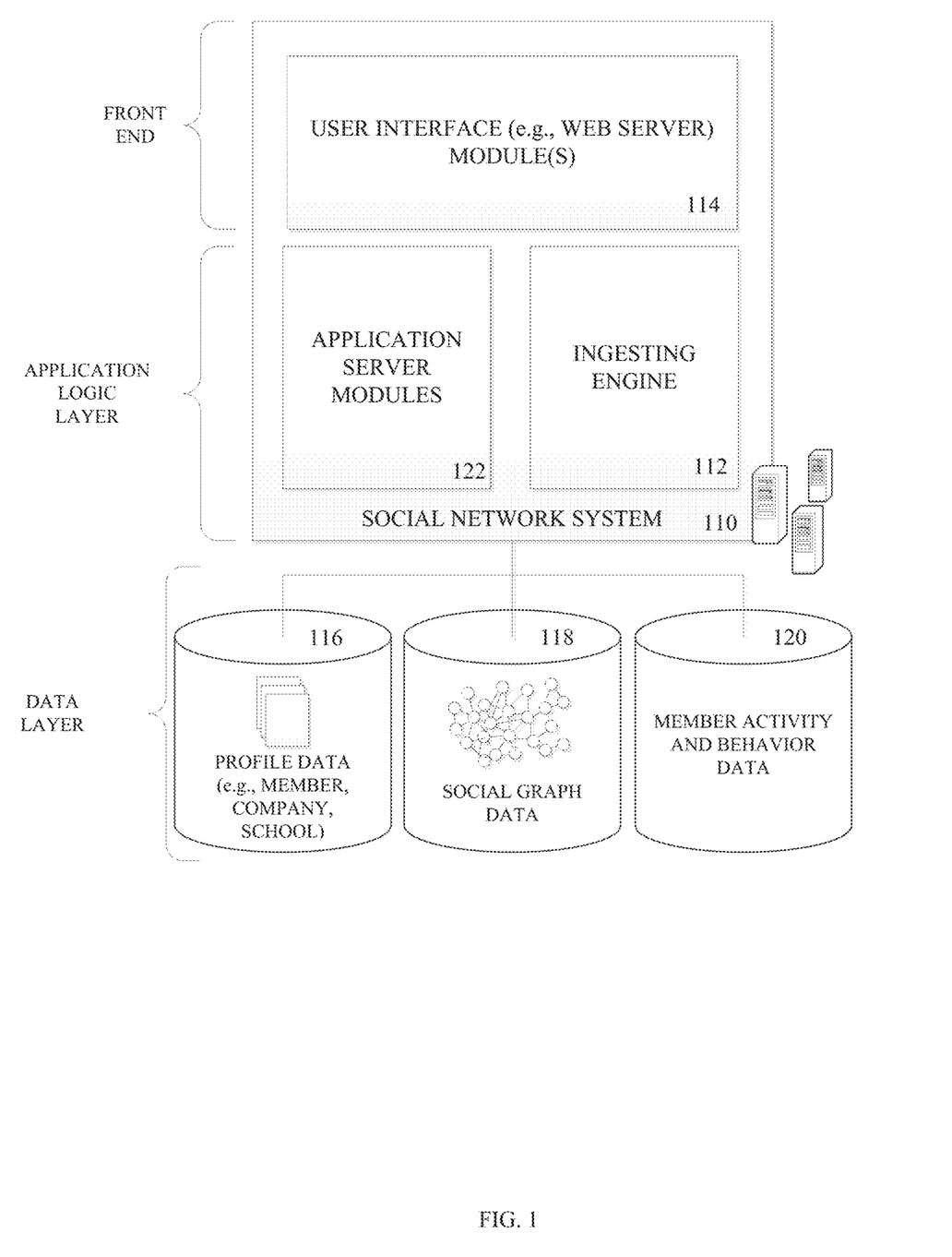
FIG. 1 is a block diagram of the functional modules or components that comprise a computer-network based social network service, including an ingesting engine consistent with some embodiments of the invention.

FIG. 1 is a block diagram of the functional modules or components that comprise a computer- or network-based social network service 10, including an ingesting engine 12 consistent with some embodiments of the invention. As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, atopic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

In addition to the various application server modules 22, the application logic layer includes an ingesting engine 12. As illustrated in FIG. 1, with some embodiments the ingesting engine 12 is implemented as a service that operates in conjunction with various application server modules 22. For instance, any number of individual application server modules 22 can invoke the functionality of the ingesting engine 12. However, with various alternative embodiments, the ingesting engine 12 may be implemented as its own application server module such that it operates as a stand-alone application. With some embodiments, the ingesting engine 12 may include or have an associated publicly available application programming interface (API) that enables third-party applications to invoke the functionality of the ingesting 12.

Figure 2:
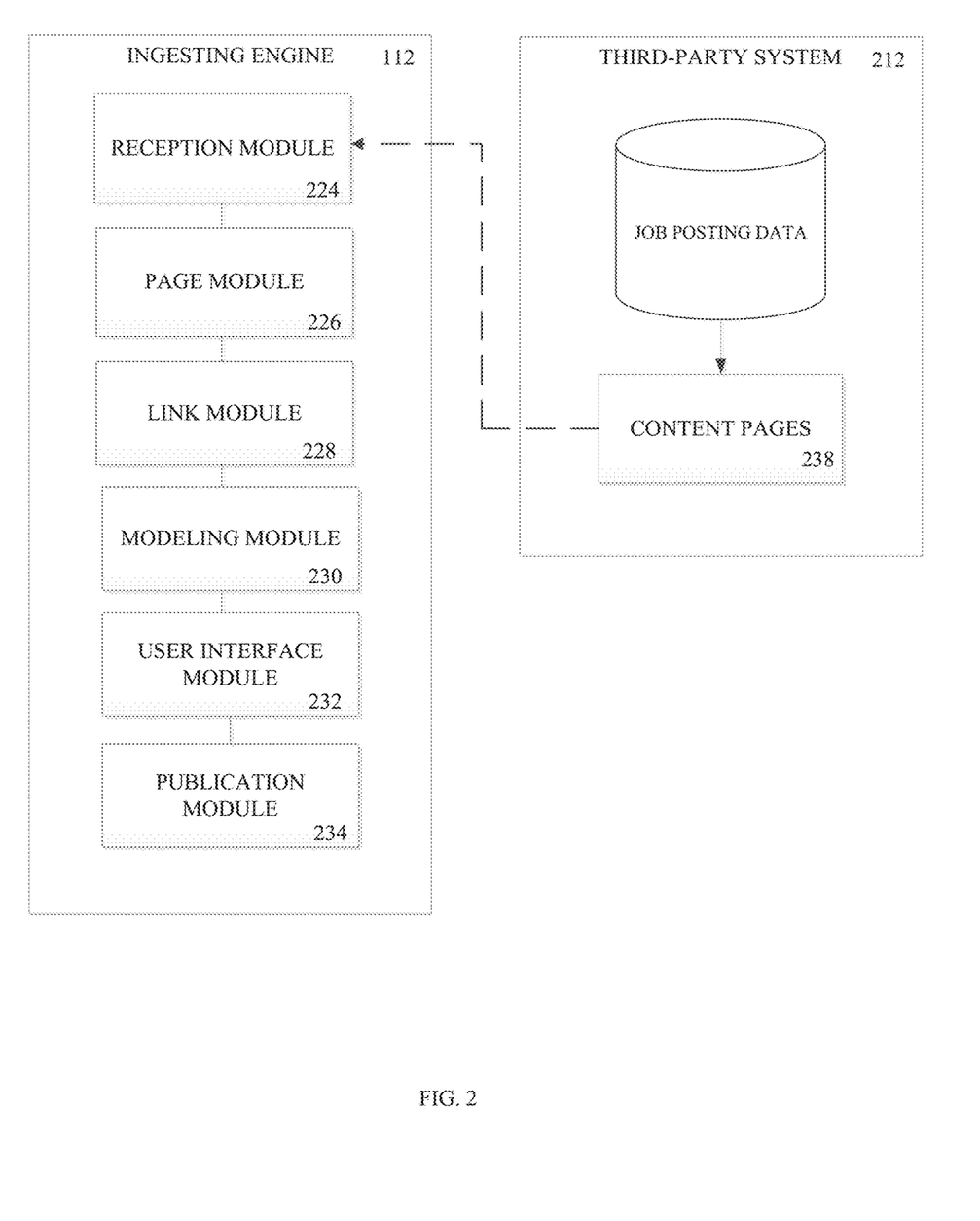
FIG. 2 is a functional block diagram of the ingesting engine of FIG. 1 and associated modules.

FIG. 2 is a functional block diagram depicting the ingesting engine of FIG. 1 and associated modules. A reception module 224 may be configured to receive references to content pages 238 published on third-party systems. The reception module 224 may be configured to parse the content pages to identify content items that are candidates for ingesting (e.g., into data fields of new job postings on the social network system). A page module 226 may be configured identify whether a content page is a page of interest (e.g., whether the content page is a job listing page or a job description page). A link module 228 may be configured to identify whether references (or links) included on a content page are links of interest (e.g., whether they may point to other content pages that may be of interest). A modeling module 230 may be configured to generate a model of a content page, including content items on the content page. This modeling may include mapping types of data fields included on the content page to types of data fields including in job postings on the social network system, as is described in more detail below. Thus, the modeling module 230 may be configured to generate a configuration for each domain. The configuration may include mappings for each page of interest associated with the domain. A user interface module 232 may be configured to generate a user interface to prompt the user to confirm or improve upon the accuracy of the mappings and configurations generated by the modeling module 230. A publication module 234 may be configured to generate job postings according to the generated data model and publish the job postings on the social network system for access by members of the social network system (e.g., just as if they had been posted by a another member of the social networking system).

Figure 3:
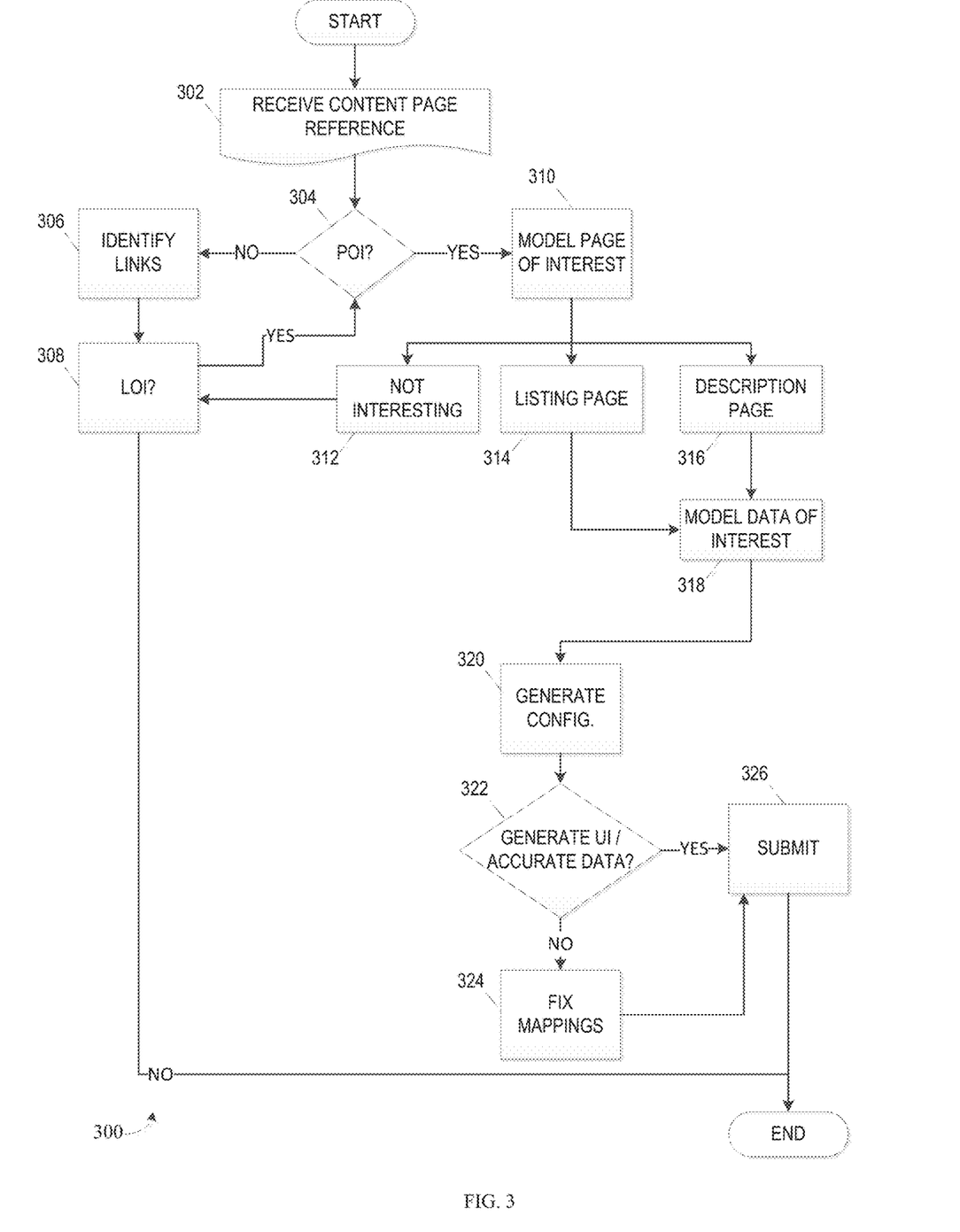
FIG. 3 is a flow diagram illustrating an example method of generating data models corresponding to content pages of interest published by a third party system.

FIG. 3 is a flow diagram illustrating an example method 300 of generating data models corresponding to content pages of interest published by a third party system. In various embodiments, the method 300 may be implemented by one or more of the modules of FIG. 2. At operation 302, the reception module 224 receives a reference to a content page published by a third-party system. In various embodiments, the content page may be referred to by a domain name (e.g., microsoft.com). The reference to the content page may be redirected to a root content page or landing page associated with the domain. The referenced content page may then serve as a content page that is currently being processed for the identification of content items published by the third-party system pertaining to job postings.

At operation 304, the page module 226 makes a threshold determination about whether the currently-processed content page may be a page of interest (POI). For example, the page module 226 makes a threshold determination about whether the content page may be a job listing page or a job description page. The threshold determination may be a high-level determination that, for example, considers a subset of factors that are considered during the modeling operation 310, which is described below.

At operation 306, based on the threshold determination 304 indicating that the content page is not a page of interest, the link module 228 identifies references (or links) to additional content pages that are included in the content page that is currently being analyzed.

At operation 308, the link module 228 analyzes the identified links to determine whether any of the links are links of interest. For example, the link module 228 determines whether text associated with the link relates to job data, such as a link entitled "Jobs" or "Careers." Then, for content pages corresponding to each link of interest, the process is repeated at operation 304, in which each of the content pages becomes the currently-processed page. After all of the content pages corresponding to links of interest have been processed, if there are not further links of interest, the process ends.

At operation 310, the modeling module 230 generates a model for each currently-processed page identified as a page of interest. The modeling may include identifying the page of interest as a job listing page at operation 314 or a job description page at operation 316. In various embodiments, a job listing page is a summary page that includes high-level data items pertaining to a job opening (such as a job title). In various embodiments, each content item featured on the job listing page may include a reference or link to an additional content page that includes additional data items pertaining to the job opening. In various embodiments, this additional content page is a job description page.

In various embodiments, upon performing operation 310, the modeling module 230 may determine at operation 312 that the page of interest is not interesting after all. For example, the modeling module 230 may determine that the page of interest is not a job listing page or a job description page, or that the page of interest does not include data of interest, such as content items corresponding to data fields of job postings on the social network system.

For each of the pages of interest, including for each job listing page and each job description page, the modeling module 230 also generates a model of data of interest. This generation of the model of the data of interest may include mapping types of data fields corresponding to content items on the currently-processed content page with types of data fields corresponding to job postings on the social network system.

For example, as described above, job postings on the social network system may include types of data fields for job title, job description, job location, job industry, employer information, salary information, and so on. In various embodiments, the modeling module 230 separately analyzes a test set (e.g., of a large number of job postings) to identify characteristics of values corresponding to each of the types of data fields in a job posting. Such characteristics may include, for example, an average length of the value (e.g., text) included in the data field, a range of the value (e.g., a number representing a salary), particular delimiters included in the value (e.g., a dollar sign for salary indicator), particular keywords included in the value, groupings of keywords included in the value, density of keywords included in the value, and so on.

The data modeling module 230 then compares the characteristics of the values corresponding to the data fields associated the job postings with the characteristics of the values corresponding to the data fields associated with the content pages. Thus, based on the similarities of values associated with the data fields, the data modeling module 230 may identify a particular type of a data field on a content page as corresponding to a particular type of a data field of a job posting.

Additionally, the modeling module 230 may analyze metadata associated with the data fields on the content page. For example, the modeling module 230 may analyze the layout of the data fields on the content page or the tags associated with the data fields to identify whether the values included in the data fields may be associated with data fields corresponding to job postings. In various embodiments, the modeling module 230 may separately analyze a test set of confirmed job description pages or job listing pages to identify characteristics of the pages, such as the position of particular key strings within the page (e.g., whether the strings are on the top of the page, bottom of the page, and so on) or URL tokenization (e.g., how URLs are constructed for purposes of pagination, such as different pages of a job listings).

With respect to identify characteristics of values corresponding to data fields associated with job postings and characteristics of different types of content pages, including job listing pages and job description pages), the modeling module 230 may determine whether keywords within the value or on the page transgress a keyword-value threshold or a keyword-page-density threshold. For example, the modeling module 230 may identify a job listing page based on a number of keywords relevant to job listings exceeding a keyword density threshold.

Similarly, for values of data fields, the modeling module 230 may identify a particular data field of a content page as corresponding to a particular data field of a job posting based on whether keywords relevant to the data field of the job posting exceed a keyword-value-density threshold. Whether a keyword is relevant to a page of a particular type or a data field may be determined by the modeling module based on an analysis of the test set of values or test set of content pages.

At operation 320, the modeling module 230 may generate a configuration for a domain (e.g., microsoft.com). The configuration may include data models for each page of interest associated with the domain. The configuration may identify particular content pages as job listing pages or job description pages. Additionally, the configuration may include mappings of data fields on each content page to data fields associated with job postings on the social network system.

At operation 322, the user interface module 232 may generate a user interface to visually represent the identified mappings between data fields included in each processed content-page and data fields associated with job postings on the social network site and prompt an administrator to confirm the identified mappings.

For example, based on an identification that a particular field of a job listing page published by a third party includes a job title, the user interface module 232 may bring up a live version of the job listing page into a web browser of the administrator, highlight the particular field, and prompt the user to confirm that the value in the field corresponds to the job title field of job postings on the social network system.

As another example, the user interface module 232 may prompt the user to confirm that a first highlighted portion of text included in a data field on a content page published by the third party corresponds to minimum requirements for a job and a second highlighted portion of text included in the data field corresponds to benefits of the job.

As another example, at operation 324, the user interface module 232 may prompt the administrator to adjust the highlighted regions to more precisely capture the mappings to the data fields of the job postings on the social network system. Or, as another example, the user interface module 232 may bring up one or more live pages published by the third party system and provide the administrator with a set of tools to specify mappings between data fields included on the pages and the data fields included in job postings on the social networking system.

At operation 326, the user interface module 232 may prompt the user to submit the mappings for inclusion in the model corresponding to the content page.

Figure 4:
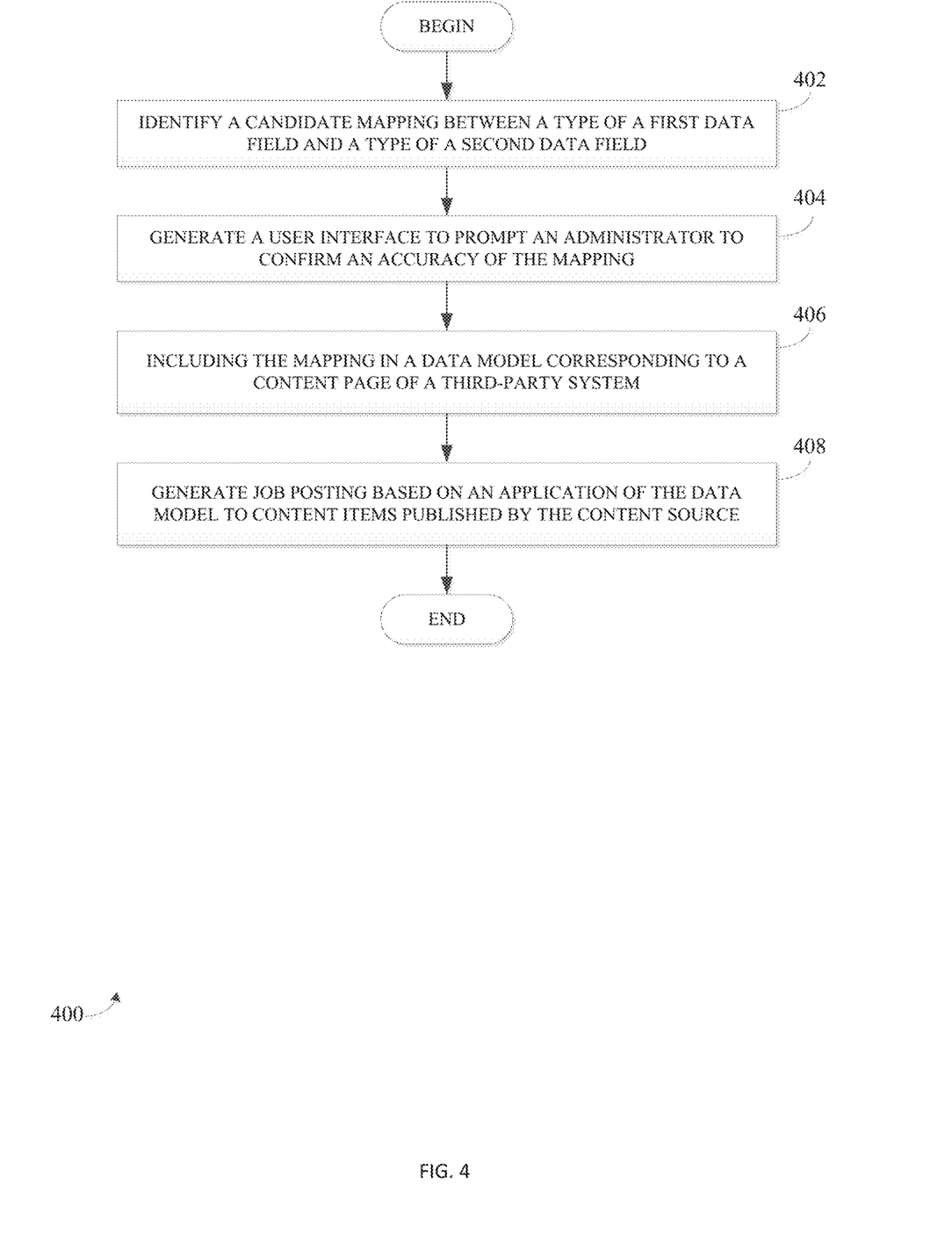
FIG. 4 is a flow diagram illustrating an example method of ingesting a job posting from a third-party system.

FIG. 4 is a flow diagram illustrating an example method 400 of ingesting a job posting from a third-party system. In various embodiments, the method 300 may be implemented by one or more of the modules of FIG. 2. At operation 402, the modeling module 230 identifies a candidate mapping between a type of a first data field and a type of a second data field. Here, the first data field is a data field included in a content page of interest on a third party system and the second data field is a data field corresponding to job postings on a social network system.

At operation 404, the user interface module 232 generates a user interface to prompt an administrator to confirm an accuracy of the mapping. In various embodiments, the user interface may also allow the user to make corrections to the identified mapping, as described above with respect to FIG. 3.

At operation 406, based on the administrator confirming the mapping, the modeling module 230 includes the mapping in a data model corresponding to the content page of interest published by the third-party system.

At operation 408, the publication module 234 generates a job posting for publication on the social network system based on the data model. Thus, for example, based on a mapping of a particular data field on the content page of interest to a particular data field of a job posting, the publication module 234 generates a job posting in which the value from the data field on the content page is copied into the corresponding data field of the generated job posting. The publication module 234 then publishes the generated job posting for access by members of the social network system.

Figure 5:
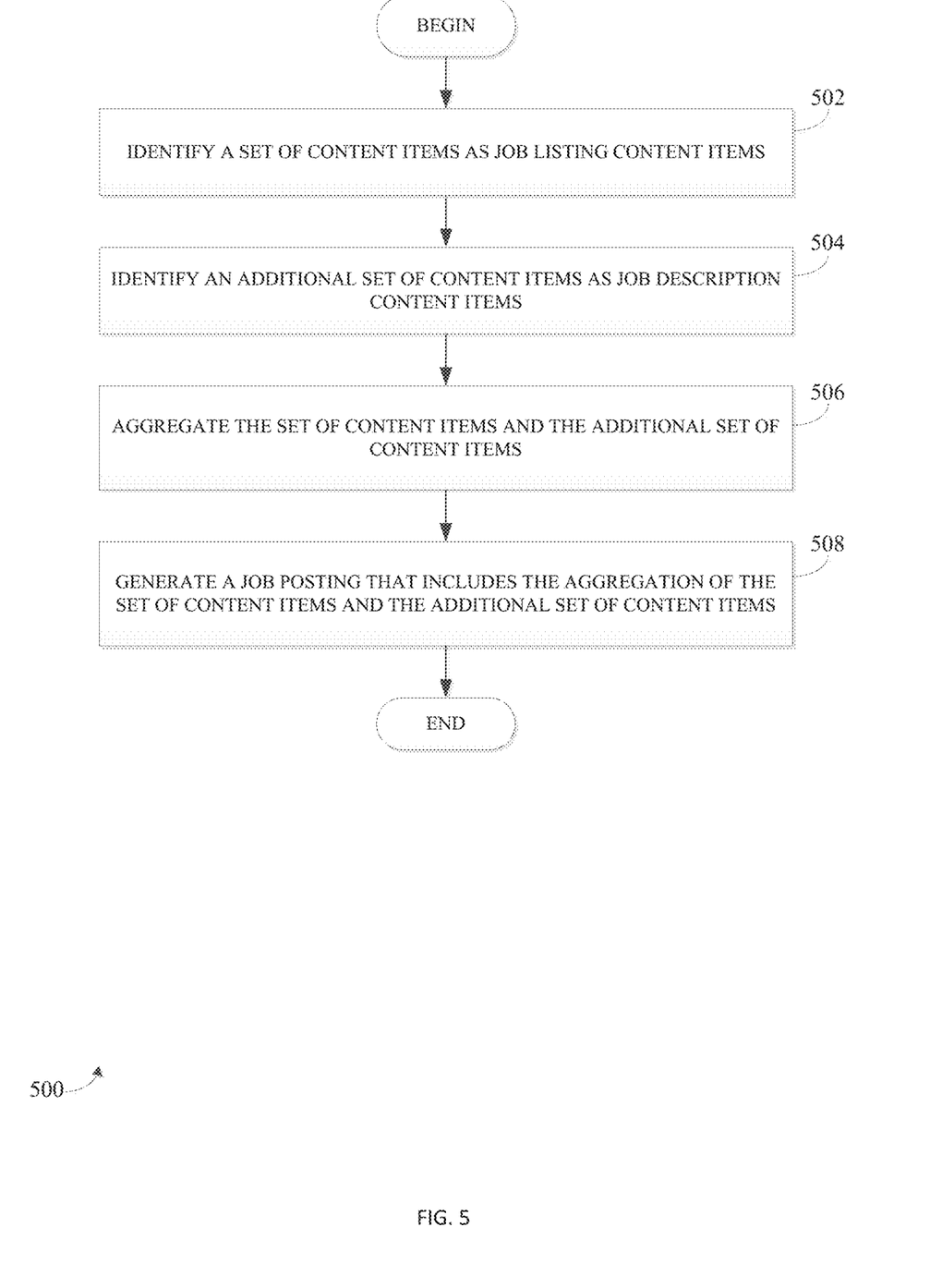
FIG. 5 is a flow diagram illustrating an example method of aggregating sets of content items between multiple content pages of interest published by a third party system.

FIG. 5 is a flow diagram illustrating an example method 500 of aggregating sets of content items between multiple content pages of interest published by a third party system. In various embodiments, the method 500 may be implemented by one or more of the modules of FIG. 2.

At operation 502, the modeling module 230 identifies a set of content items as job listing content items (e.g., based on the set content items being associated with a link to a job description page).

At operation 504, the modeling module 230 identifies an additional set of content items as job description content items (e.g., based on the values corresponding to the additional set of content items having a longer length than the values corresponding to the set of content items).

At operation 506, the modeling module 230 aggregates the set of content items and the additional set of content items. In various embodiments, based on the set of content items overlapping with the additional set of content items, the modeling module 230 may need to resolve ambiguities between the sets of content items.

For example, if a content item included on the job listing page and a content items included on the job description page both map to a single data item of a job posting (e.g., a job title), any differences between the content items will need to be resolved. In various embodiments, the modeling module 230 may give precedence to the data item on the job description page by default. In various embodiments, the ambiguity may be resolved by providing multiple values or a range of possible values for the data item. In various embodiments, the user interface module 232 may generate a user interface for presentation to an administrator to specify which content item should take precedence in the case of an ambiguity.

At operation 508, the publication module 234 generates a job posting based on the aggregation of the set of content items and the additional set of content items. Thus, for example, information pertaining to a job opening that is specified on two different content pages (e.g., a job listing page and a job description page) on the third-party system may be incorporated into a single job posting generated for publication on the social network system.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
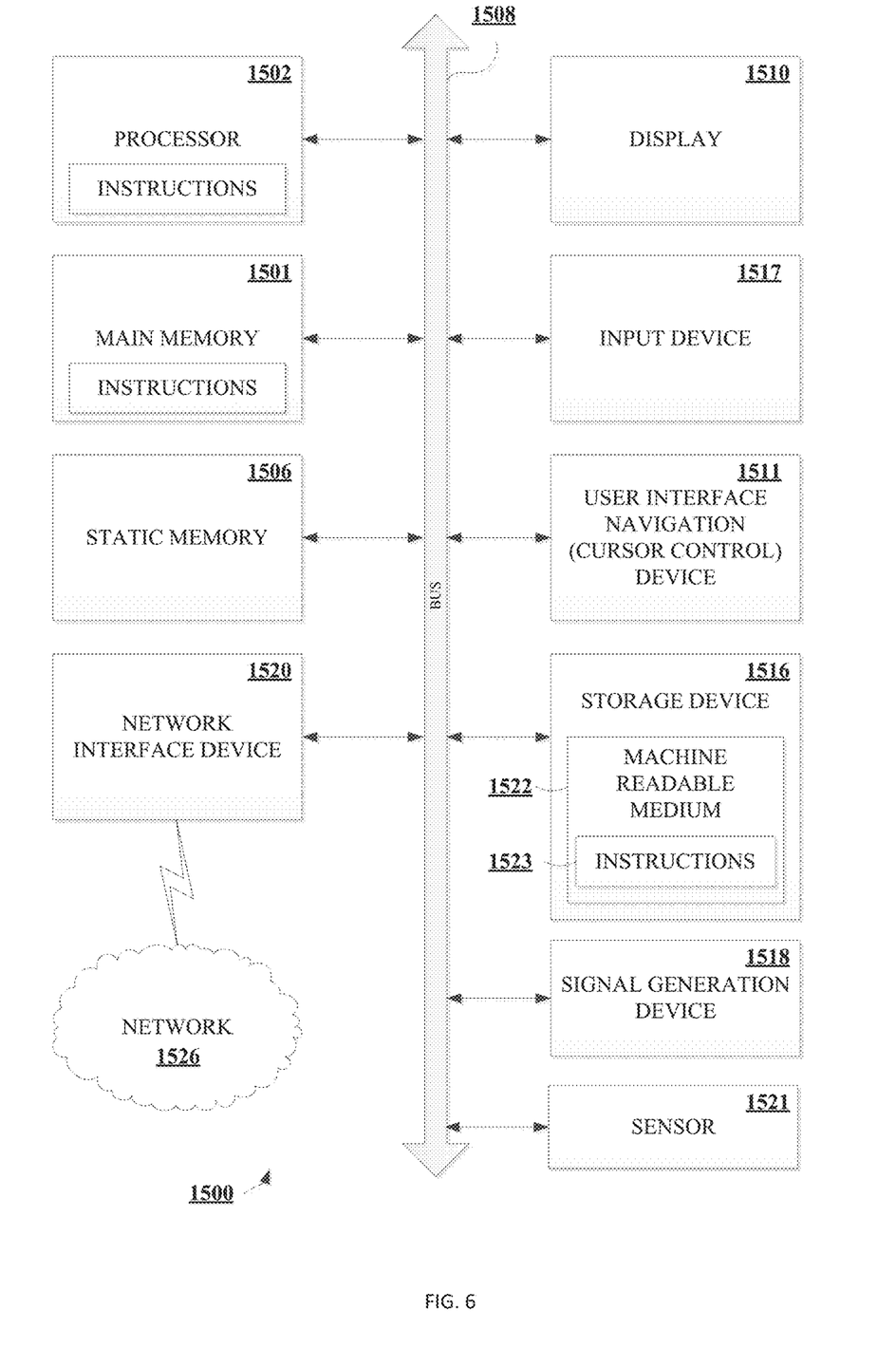
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (pc), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:

performing operations for enhancing a user interface of a social networking system, the user interface including job postings published on the social networking system, the enhancing including generating additional job postings for publishing on the social networking system, the additional job postings derived from content items included on pages of interest published on a third-party system, the operations comprising:

identifying a candidate mapping between a type of a data field corresponding to the content items included on the pages of interest published on the third-party system and a type of a data field corresponding to job postings published on the social-networking system, the data field of the job posting published on the social networking system pertaining to one of a job title, a job description, a job location, a job industry, employer information, or salary information, wherein the identifying of the candidate mapping is performed by:
identifying particular ones of data fields corresponding to content items included on the pages of interest,
identifying corresponding data fields of the job posting published on the social networking system, and
establishing a relationship between the particular ones of data fields corresponding to content items included on the pages of interest and the corresponding data fields of the job posting published on the social media system;
automatically generating an additional user interface by bringing up a live version of a page of interest published on a third-party system into a web browser of an administrator to prompt the administrator to identify the candidate mapping as a confirmed mapping, the user interface further highlighting on the live version of the page of interest the particular data fields corresponding to the content items included in the page of interest;
generating the additional job postings for publishing on the social-networking system based on an application of the confirmed mapping to additional content items on the third-party system having the type of the data field corresponding to the content items published on the third-party system, the publishing including making the additional job postings accessible on the social networking system as if they had been posted by a member of the social-networking system; and
causing presentation of specific ones of the additional job postings based on tracking of user-related activities and events on the social-networking system.

2. The method of claim 1, wherein the type of the data field corresponding to the job postings is a job description and one of the characteristics is that an average length of values associated with the content items published on the third-party system transgresses a job-description-length threshold.

3. The method of claim 1, further comprising:
detecting changes to the content items published on the third-party site; and
updating the additional job postings to reflect the changes.

4. The method of claim 3, wherein the change includes a removing at least one of the content items and the updating includes removing at least one of the job postings.

5. The method of claim 1, further comprising:
distinguishing a job description page from a job listing page published on the third-party system; and
identifying the content items based on the content items being including on the job listing page.

6. The method of claim 5, wherein the generating of the additional job postings includes resolving an ambiguity between a first one of the additional content items included on a job listing page and second one of the additional content items included on a job description page, the resolving of the ambiguities including incorporating a specification by an administrator via the additional user interface as to which of the additional content items should take precedence.

7. A system comprising:
one or more computer processors;
one or more computer memories;
a set of instructions incorporated into the one or more computer memories, the set of instructions configuring the one or more computer processors to perform operations for enhancing a user interface of a social networking system, the user interface including job postings published on the social networking system; the enhancing including generating additional job postings for publishing on the social networking system, the additional job postings derived from content items included on pages of interest published on a third-party system; the operations comprising:
identifying a candidate mapping between a type of a data field corresponding to the content items included on the pages of interest published on the third-party system and a type of a data field corresponding to job postings published on the social-networking system, the data field of the job posting published on the social networking system pertaining to one of a job title, a job description, a job location, a job industry, employer information, or salary; information, wherein the identifying of the candidate mapping is performed by:
identifying particular ones of data fields corresponding to content items included on the pages of interest,
identifying corresponding data fields of the job posting published on the social networking system, and
establishing a relationship between the particular ones of data fields corresponding to content items included on the pages of interest and the corresponding data fields of the job posting published on the social media system;
automatically generating an additional user interface by bringing up a live version of a page of interest published on a third-party system into a web browser of an administrator to prompt the administrator to identify the candidate mapping as a confirmed mapping, the user interface further highlighting on the live version of the page of interest the particular data fields corresponding to the content items included in the page of interest;
generating the additional job postings for publishing on the social-networking system based on an application of the confirmed mapping to additional content items on the third-party system having the type of the data field corresponding to the content items published on the third-party system, the publishing including making the additional job postings accessible on the social networking system as if they had been posted by a member of the social-networking system; and
causing presentation of specific ones of the additional job postings based on tracking of user-related activities and events on the social-networking system.

8. The system of claim 7, wherein the type of the data field corresponding to the job postings is a job description and one of the characteristics is that an average length of values associated with the content items published on the third-party system transgresses a job-description-length threshold.

9. The system of claim 7, further comprising:
detecting changes to the content items published on the third-party site; and
updating the additional job postings to reflect the changes.

10. The system of claim 9, wherein the change includes a removing at least one of the content items and the updating includes removing at least one of the job postings.

11. The system of claim 7, further comprising:
distinguishing a job description page from a job listing page published on the third-party system; and
identifying the content items based on the content items being including on the job listing page.

12. The system of claim 11, wherein the generating of the additional job postings includes resolving an ambiguity between a first one of the additional content items included on a job listing page and second one of the additional content items included on a job description page, the resolving of the ambiguities including incorporating a specification by an administrator via the additional user interface as to which of the additional content items should take precedence.

13. A non-transitory computer-readable storage medium storing instructions thereon, which, when executed by one or more processors, cause the one or more processors to perform operations for enhancing a user interface of a social networking system, the user interface including job postings published on the social networking system, the enhancing including generating additional job postings for publishing on the social networking system, the additional job postings derived from content items included on pages of interest published on a third-party system, the operations comprising:
identifying a candidate mapping between a type of a data field corresponding to the content items included on the pages of interest published on the third-party system and a type of a data field corresponding to job postings published on the social-networking system, the data field of the job posting published on the social networking system pertaining to one of a job title, a job description, a job location, a job industry, employer information, or salary information, wherein the identifying of the candidate mapping is performed by:
identifying particular ones of data fields corresponding to content items included on the pages of interest,
identifying corresponding data fields of the job posting published on the social networking system, and
establishing a relationship between the particular ones of data fields corresponding to content items included on the pages of interest and the corresponding data fields of the job posting published on the social media system;
automatically generating an additional user interface by bringing up a live version of a page of interest published on a third-party system into a web browser of an administrator to prompt the administrator to identify the candidate mapping as a confirmed mapping, the user interface further highlighting on the live version of the page of interest the particular data fields corresponding to the content items included in the page of interest;
generating the additional job postings for publishing on the social-networking system based on an application of the confirmed mapping to additional content items on the third-party system having the type of the data field corresponding to the content items published on the third-party system, the publishing including making the additional job postings accessible on the social networking system as if they had been posted by a member of the social-networking system; and
causing presentation of specific ones of the additional job postings based on tracking of user-related activities and events on the social-networking system.

14. The non-transitory computer-readable storage medium of claim 13, wherein the type of the data field corresponding to the job postings is a job description and one of the characteristics is that an average length of values associated with the content items published on the third-party system transgresses a job-description-length threshold.

15. The non-transitory computer-readable storage medium of claim 13, further comprising:
detecting changes to the content items published on the third-party site; and
updating the additional job postings to reflect the changes.

16. The non-transitory computer-readable storage medium of claim 15, wherein the change includes a removing at least one of the content items and the updating includes removing at least one of the job postings.

17. The non-transitory computer-readable storage medium of claim 13, further comprising:
distinguishing a job description page from a job listing page published on the third-party system; and
identifying the content items based on the content items being including on the job listing page.

* * * * *

UNITED STATES PATENT AND TRADEMARK OFFICE
CERTIFICATE OF CORRECTION

PATENT NO. : 10,860,982 B2
APPLICATION NO. : 14/526357
DATED : December 8, 2020
INVENTOR(S) : Duerr et al.

Page 1 of 1

It is certified that error appears in the above-identified patent and that said Letters Patent is hereby corrected as shown below:

In the Claims

In Column 12, Line 9, in Claim 7, delete "system;" and insert --system,-- therefor In Column 12, Line 14, in Claim 7, delete "system;" and insert --system,-- therefor In Column 12, Line 24, in Claim 7, delete "salary;" and insert --salary-- therefor Signed and Sealed this
Second Day of November, 2021

Drew Hirshfeld
*Performing the Functions and Duties of the
Under Secretary of Commerce for Intellectual Property and
Director of the United States Patent and Trademark Office*